United States Patent
Itoh 4,196,969
Apr. 8, 1980

[54] ZOOM LENS HAVING A SMALL DISTORTION ABERRATION

[75] Inventor: Takayuki Itoh, Tokyo, Japan

[73] Assignee: Asahi Kogaku Kogyo Kabushiki Kaisha, Tokyo, Japan

[21] Appl. No.: 928,321

[22] Filed: Jul. 26, 1978

[30] Foreign Application Priority Data

Jul. 30, 1977 [JP] Japan .................... 52-91845

[51] Int. Cl.² ............................................ G02B 15/16
[52] U.S. Cl. ..................... 350/184; 350/207
[58] Field of Search ............... 350/184, 186, 176, 207

[56] References Cited

U.S. PATENT DOCUMENTS

| | | | |
|---|---|---|---|
| 3,918,797 | 11/1975 | Takano | 350/207 X |
| 3,918,798 | 11/1975 | Takano | 350/207 X |

*Primary Examiner*—Paul A. Sacher
*Attorney, Agent, or Firm*—Sughrue, Rothwell, Mion, Zinn and Macpeak

[57] ABSTRACT

The present invention provides a compact zoom lens which exhibits only small distortion aberration. The present invention comprises, in order from the object side, a first lens group having a negative focal length, a second lens group having a positive focal length, and a third lens group having a negative focal length. The overall focal length is variable by moving mechanically the first, second and third lens groups, but the position of the image surface is maintained constant. In the zoom lens of the present invention, the resultant focal length of the first and second lens groups is positive during the entire zoom range, and the aerial spaces between the first and second lens groups and between the second and third lens groups, respectively, are reduced so that the overall viewing angle is also reduced. The first lens group is composed of a negative lens component and a positive lens component in order from the object side. The negative lens component is constructed using two negative lenses. The second lens group is composed of positive, negative and positive lens components in order from the object side. The first positive lens component is constructed using three positive lenses. The third positive components are constructed using two positive lenses. The third lens group is composed, in order from the object side, of a positive lens having a strong convex surface on the image side in the direction of the image, a negative double concave lens, and a positive lens having a strong convex surface on the object side in the direction of the object.

2 Claims, 8 Drawing Figures

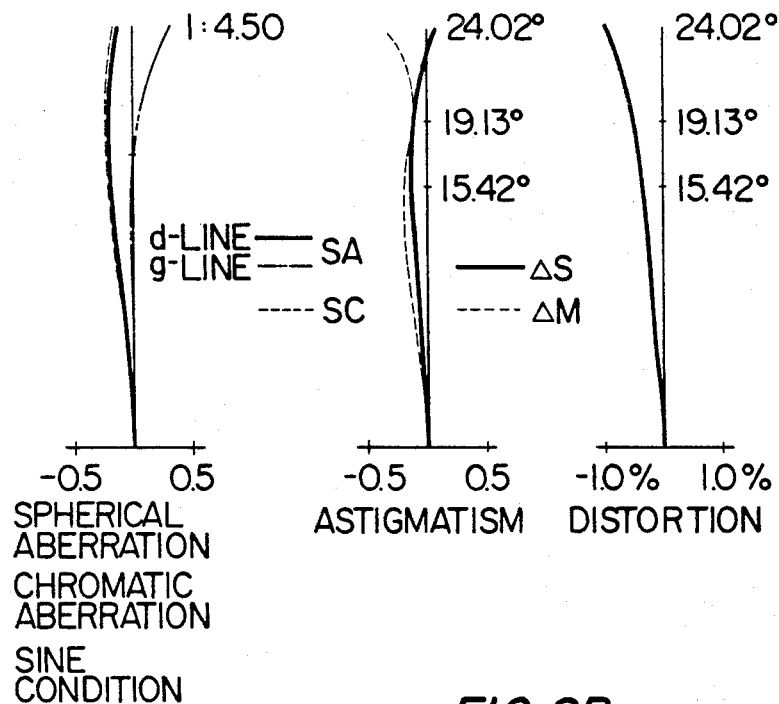
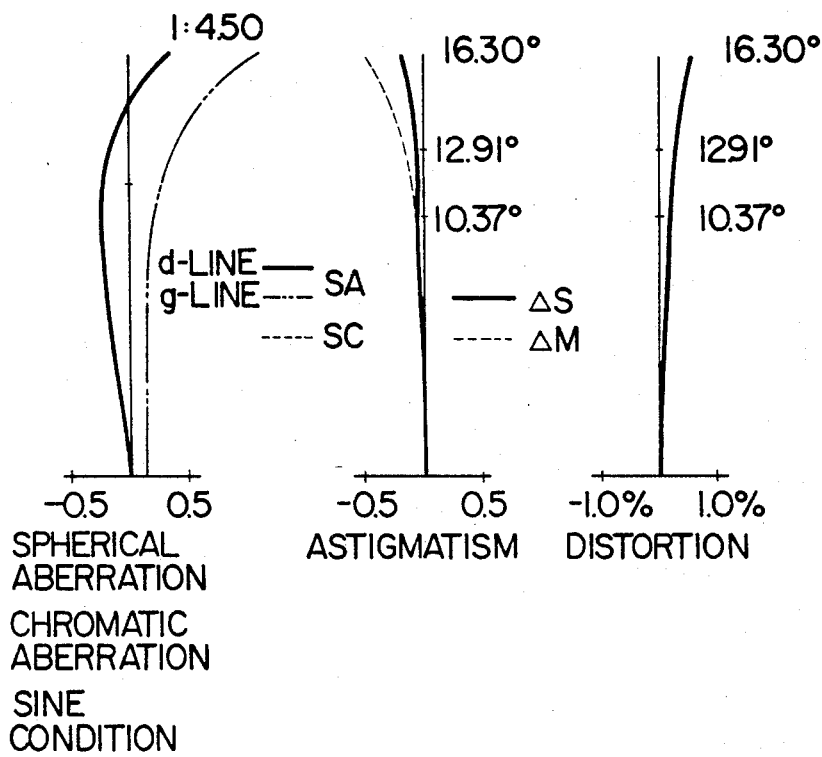

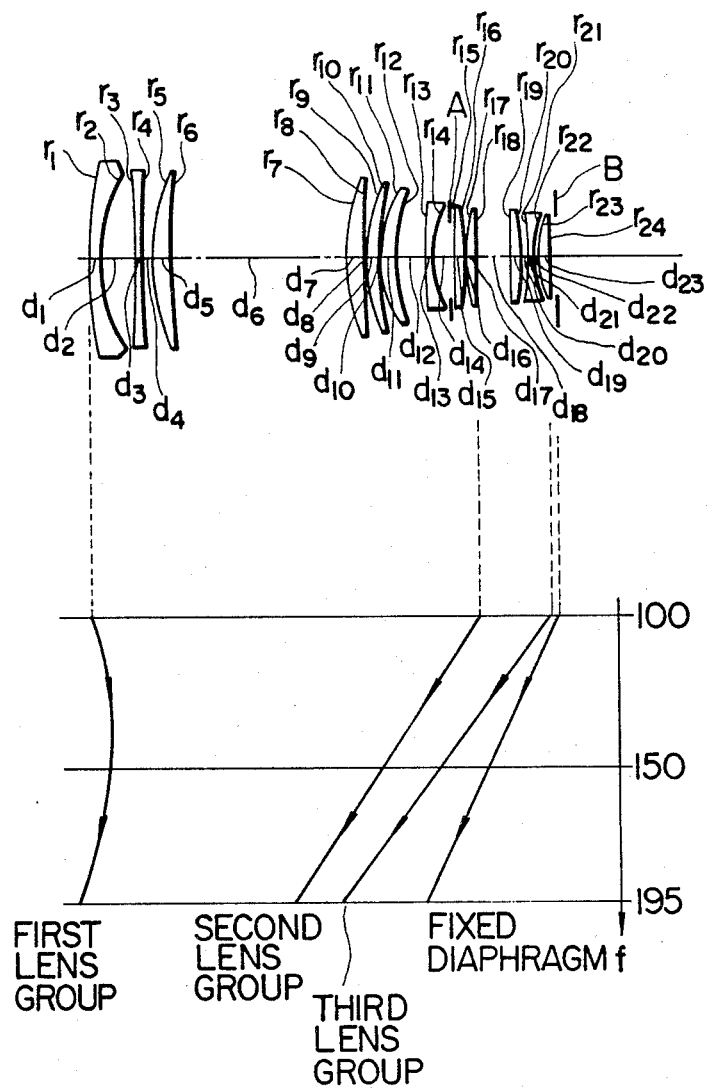

ZOOM LENS HAVING A SMALL DISTORTION ABERRATION

BACKGROUND OF THE INVENTION

1. Field of the Invention

The present invention relates to a compact zoom lens wherein distortion aberration during the overall zoom range is compensated for to the same extent as is found in a fixed focus lens.

2. Description of the Prior Art

In a conventional four-lens-group type zoom lens having, for example, a focusing lens group, a variator, a compensator and a relay lens group, barrel distortion at the wide angle position and pincushion distortion aberration at the narrow angle position are generated to a substantial degree.

In the two-lens-group type zoom lens having, for example, a first lens group with a negative focal length and a second lens group with a positive focal length, barrel distortion aberration is increased at the wide angle position. It is very difficult to compensate for this distortion aberration. Therefore, the increase of distortion aberration has been considered to be inevitable in conventional zoom lens system with respect to the distortion aberration present in comparable fixed focal lens.

SUMMARY OF THE INVENTION

The present invention provides a compact zoom lens which exhibits only small distortion aberration. The present invention comprises, in order from the object side, a first lens group having a negative focal length, a second lens group having a positive focal length, and a third lens group having a negative focal length. The overall focal length is variable by moving mechanically the first, second and third lens groups, but the position of the image surface is maintained constant. In the zoom lens of the present invention, the resultant focal length of the first and second lens groups is positive during the entire zoom range, and the aerial spaces between the first and second lens groups and between the second and third lens groups, respectively, are reduced so that the overall viewing angle is also reduced. The first lens group is composed of a negative lens component and a positive lens component in order from the object side. The negative lens component is constructed using two negative lenses. The second lens group is composed of positive, negative and positive lens components in order from the object side. The first positive lens component is constructed using three positive lenses. The final positive lens component is constructed using two positive lenses. The third lens group is composed, in order from the object side, of a positive lens having a strong convex surface on the image side in the direction of the image, a negative double concave lens, and a positive lens having a strong convex surface on the object side in the direction of the object.

BRIEF DESCRIPTION OF THE DRAWINGS

FIGS. 2A, 2B and 2C are graphs plotting the aberration curves obtained at the wide angle, middle angle, and narrow angle positions, respectively, of the zoom lens system constructed according to the first example;

FIG. 3 is a simplified cross-sectional view of the zoom lens system according to the second specific example of the present invention; and, FIGS. 4A, 4B and 4C are graphs plotting the aberration curves obtained at the wide angle, middle angle, and narrow angle positions, respectively, of the zoom lens system constructed according to the second example.

DETAILED DESCRIPTION OF THE INVENTION

Figure 1:
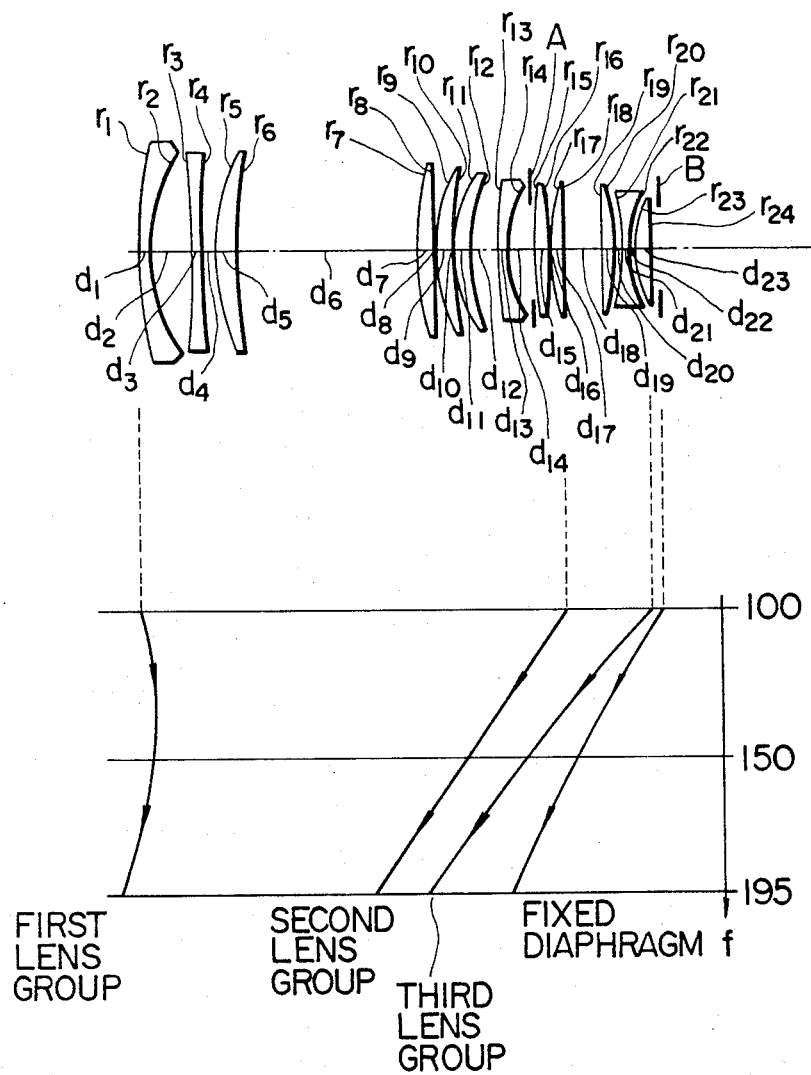
FIG. 1 is a simplified cross-sectional view of the zoom lens system according to the first specific example of the present invention.

The zoom lens system according to the present invention satisfies the four conditions given below and exhibits a small distortion aberration:

(1) $0.55 < f_{W12}/f_W < 0.90$
(2) $1.30 < |f_3|/f_W < 3.00$
(3) $0.0 < (l_{W2} - l_{T2})/(l_{W1} - l_{T1}) < 0.33$
(4) $-0.50 < \Sigma P_3 < 0.0$ where:

$f_W$ is the overall focal length at the wide angle position;

$f_{W12}$ is the resultant focal length of the first and second lens groups at the wide angle position;

$f_3$ is the focal length of the third lens group;

$l_{W1}$ is the aerial space between the first and second lens groups at the wide angle position;

$l_{W2}$ is the aerial space between the second and third lens groups at the wide angle position;

$l_{T1}$ is the aerial space between the first and second lens groups at the narrow or telescopic angle position;

$l_{T2}$ is the aerial space between the second and third lens groups at the narrow or telescopic angle position; and $\Sigma P_3$ is the Petzval sum of the third lens group when the overall focal length is estimated as 1.0 at the wide angle position.

In the present invention, the first, second and third lens groups have negative, a positive and a negative focal lengths, respectively, and the aerial spaces between the first and second lens groups and between the second and the third lens groups are reduced to thereby reduce the overall viewing angle.

While the lens construction of the first and second lens groups is conventional, the discovery of the present invention is to provide the third lens group at the position closest the image and furthest from the object. This addition of the third lens group prevents the generation of the pincushion distortion aberration at the narrow angle position, and also prevents the generation of the strong barrel distortion aberration in the first and second lens groups.

Conditions (1) and (2) given above relate to the lens power arrangement. The aberration compensation can be substantially achieved by exceeding the upper limit of the condition (1), but this causes the overall size of the lens system to become large. Accordingly, exceeding the upper limit of condition (1) is incompatible with the goal of miniaturization of the zoom lens. However, when condition (1) is not exceeded, the barrel distortion is increased and the back focal length is decreased. Thus, in order to effect aberration compensation, it is necessary to enhance the negative power of the third lens group. But, this enhancement makes various aberration compensations difficult.

Condition (2) together with condition (1) define the lens system of the present invention. Above the upper limit of condition (2), the size of the lens system is very large. Below the lower limit of the condition (2), effective miniaturization of the lens system can be achieved, but the lens power becomes too strong. These constraints make various aberration compensations difficult.

Condition (3) relates to the zooming method. Below the lower limit of condition (3), the directions of the variations of the aerial spaces between the first and second lens groups and between the second and third lens groups become opposite to each other, and the variation amount of the overall focal length corresponding to the variation amount of the aerial space between the first and second lens groups becomes small. This requires the elongation of the aerial space between the first and second lens groups, which substantially increases the overall size of the lens system and makes compensation of barrel distortion at the wide angle position difficult. Above the upper limit of condition (3), which is effective to miniaturize the lens system, the aerial space between the second and third lens groups is elongated and the back focal length is shortened. In order to overcome these two disadvantages, the enhancement of the negative lens power of the third lens group is required. This enhancement makes various aberration compensations difficult.

Condition (4) relates to the image surface distortion. Above the upper limit of condition (4), it is impossible to compensate for the under-aberration generated by the first and second lens groups. In contrast, below the lower limit of condition (4), the Petzval sum of the overall lens system is negative so that the image is too exaggerated and the flatness of the image is deteriorated.

It in the present invention is desired to eliminate flare by providing another fixed diaphragm behind the third lens group on the image side and by moving the diaphragm in response to the variation of the focal length or the opening and closing the aperture of the fixed diaphragm.

Two specific examples of the present invention will be described hereinbelow.

EXAMPLE 1

With reference to FIG. 1, a zoom lens system in accordance with the present invention comprising twelve lenses grouped in three lens groups was constructed. The first lens group has three lenses, with the first and second lenses $L_1$, $L_2$ being negative lenses, and third lens $L_3$ being a positive lens. Second group has six lenses, with the fourth, fifth and sixth lenses $L_4$, $L_5$, $L_6$ all being positive lenses, with the seventh lens $L_7$ being negative, and with the eighth and ninth lenses $L_8$, $L_9$ both being positive. An aperture A is disposed between lenses $L_7$ and $L_8$. The third lens group has three lenses, with the tenth lens $L_{10}$ being a positive lens, with the eleventh lens $L_{11}$ being a negative double concave lens, and with the twelfth lens $L_{12}$ being a positive lens. A fixed diaphragm B is disposed adjacent the image side of the twelfth lens $L_{12}$. The radii of curvature $r_1$ to $r_{24}$, the spacing or thickness $d_1$ to $d_{23}$, the refractive indices $n_1$ to $n_{12}$ and Abbe numbers $\nu_1$ to $\nu_{12}$ of the lenses are given below.

| | | 1 : 4.50 overall focal length f = 100 - 195 half of the viewing angle ω = 24.02 - 12.67 | | | |
|---|---|---|---|---|---|
| | lens | radius of curvature | spacing and thick-ness | refractive index at d-line | Abbe No. |
| first lens group | $L_1$ | $r_1 = 131.718$ | $d_1 = 4.27$ | $n_1 = 1.83400$ | $\nu_1 = 37.2$ |
| | | $r_2 = 52.309$ | $d_2 = 15.63$ | | |
| | $L_2$ | $r_3 = 352.328$ | $d_3 = 3.05$ | $n_2 = 1.62041$ | $\nu_2 = 60.3$ |
| | | $r_4 = 325.646$ | $d_4 = 4.65$ | | |
| | $L_3$ | $r_5 = 83.002$ | $d_5 = 7.56$ | $n_3 = 1.80518$ | $\nu_3 = 25.4$ |
| | | $r_6 = 195.786$ | $d_6 = 60.18$ | | |
| second lens group | $L_4$ | $r_7 = 105.305$ | $d_7 = 6.10$ | $n_4 = 1.67000$ | $\nu_4 = 57.4$ |
| | | $r_8 = 1716.251$ | $d_8 = 0.12$ | | |
| | $L_5$ | $r_9 = 62.784$ | $d_9 = 6.10$ | $n_5 = 1.72916$ | $\nu_5 = 54.7$ |
| | | $r_{10} = 121.197$ | $d_{10} = 0.12$ | | |
| | $L_6$ | $r_{11} = 44.664$ | $d_{11} = 5.73$ | $n_6 = 1.51633$ | $\nu_6 = 64.1$ |
| | | $r_{12} = 67.222$ | $d_{12} = 9.67$ | | |
| | $L_7$ | $r_{13} = 227.221$ | $d_{13} = 3.32$ | $n_7 = 1.80518$ | $\nu_7 = 25.4$ |
| | | $r_{14} = 38.928$ | 9.51 | | |
| | $L_8$ | $r_{15} = 186.662$ | $d_{15} = 5.18$ | $n_8 = 1.51821$ | $\nu_8 = 65.0$ |
| | | $r_{16} = -135.927$ | $d_{16} = 0.12$ | | |
| | $L_9$ | $r_{17} = 74.796$ | $d_{17} = 4.76$ | $n_9 = 1.51633$ | $\nu_9 = 64.1$ |
| | | $r_{18} = 415.941$ | $d_{18} = 13.01$ | | |
| third lens group | $L_{10}$ | $r_{19} = 1144.956$ | $d_{19} = 4.63$ | $n_{10} = 1.60342$ | $\nu_{10} = 38.0$ |
| | | $r_{20} = -73.422$ | $d_{20} = 2.45$ | | |
| | $L_{11}$ | $r_{21} = -82.044$ | $d_{21} = 2.68$ | $n_{11} = 1.62041$ | $\nu_{11} = 60.3$ |
| | | $r_{22} = 37.131$ | $d_{22} = 1.62$ | | |
| | $L_{12}$ | $r_{23} = 41.818$ | $d_{23} = 4.70$ | $n_{12} = 1.67000$ | $\nu_{12} = 57.4$ |
| | | $r_{24} = 150.531$ | | | |

| overall focal length | 100 | 150 | 195 |
|---|---|---|---|
| $d_6$ | 60.18 | 20.28 | 0.99 |
| $d_{18}$ | 13.01 | 6.13 | 2.80 |

$$\frac{f_{W12}}{f_W} = 0.7276$$

-continued

| 1 : 4.50 overall focal length f = 100 - 195 |
| --- |
| half of the viewing angle ω = 24.02 - 12.67 |
| $\frac{|f_3|}{f_W} = 2.237$ |
| $\frac{l_{W_2} - l_{T_2}}{l_{W_1} - l_{T_1}} = 0.172$ |
| $\Sigma P_3 = -0.325$ |

The diaphragm A is positioned 8.20 after the fourteenth surface.

The fixed diaphragm B is positioned 3.60 after the twenty-fourth surface at the wide angle position and is moved in proportion to the movement of the third lens group. The proportion constant is 0.683. The fixed aperture of the fixed diaphragm B is 14.70.

Figure 2C:
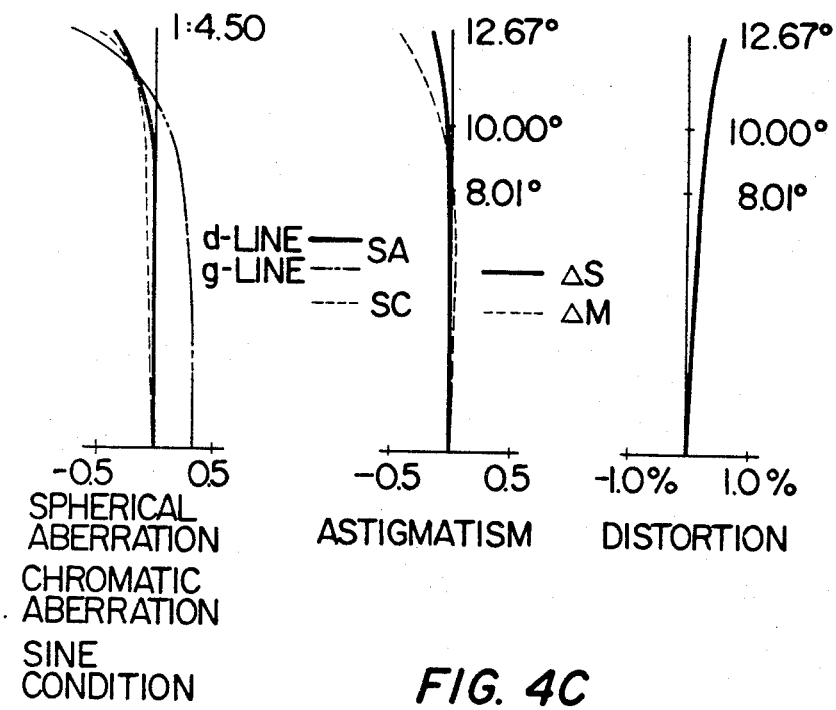

FIGS. 2A, 2B and 2C plot, respectively, the spherical and chromatic aberrations and sine condition, the astigmatism aberration, and the distortion aberration of the zoom lens system of Example 1 of the present invention at the wide angle position, the middle angle position, and the narrow angle position, respectively.

EXAMPLE 2

FIG. 3 shows a zoom lens system having the same overall structure as the zoom lens system of Example 1. However, this zoom lens system was constructed according to the following parameters:

| | | | 1 : 5.60 overall focal length f = 100 - 195 half of the viewing angle ω = 24.06 - 12.64 | | | |
| --- | --- | --- | --- | --- | --- | --- |
| | | lens | radius of curvature | spacing and thickness | refractive index at d-line | Abbe No. |
| first lens group | | $L_1$ | $r_1 = 224.091$ | $d_1 = 3.61$ | $n_1 = 1.83400$ | $v_1 = 37.2$ |
| | | | $r_2 = 52.831$ | $d_2 = 11.96$ | | |
| | | $L_2$ | $r_3 = -631.977$ | $d_3 = 2.93$ | $n_2 = 1.72916$ | $v_2 = 54.7$ |
| | | | $r_2 = 630.769$ | $d_4 = 3.05$ | | |
| | | $L_3$ | $r_5 = 77.073$ | $d_5 = 6.44$ | $n_5 = 1.80518$ | $v_1 = 25.4$ |
| | | | $r_6 = 208.593$ | $d_6 = 60.41$ | | |
| second lens group | | $L_4$ | $r_7 = 85.176$ | $d_7 = 6015$ | $n_4 = 1.64000$ | $v_4 = 60.1$ |
| | | | $r_8 = 528.837$ | $d_8 = 0.12$ | | |
| | | $L_5$ | $r_9 = 59.403$ | $d_9 = 5.46$ | $n_5 = 1.69680$ | $v_5 = 55.5$ |
| | | | $r_{10} = 120.931$ | $d_{10} = 0.12$ | | |
| | | $L_6$ | $r_{11} = 42.802$ | $d_{11} = 5.07$ | $n_6 = 1.51633$ | $v_6 = 64.1$ |
| | | | $r_{12} = 65.623$ | $d_{12} = 10.07$ | | |
| | | $L_7$ | $r_{13} = 192.384$ | $d_{13} = 2.44$ | $n_7 = 1.8.518$ | $v_7 = 25.4$ |
| | | | $r_{14} = 35.021$ | $d_{14} = 7.51$ | | |
| | | $L_8$ | $r_{15} = 247.823$ | $d_{15} = 3.90$ | $n_8 = 1.51821$ | $v_8 = 65.0$ |
| | | | $r_{16} = -126.779$ | $d_{16} = 0.12$ | | |
| | | $L_9$ | $r_{16} = 64.027$ | $d_{17} = 3.90$ | $n_9 = 1.51821$ | $v_9 = 65.0$ |
| | | | $r_{18} = 377.138$ | $d_{18} = 11.73$ | | |
| third lens group | | $L_{10}$ | $r_{19} = 2820.048$ | $d_{19} = 3.71$ | $n_{10} = 1.59270$ | $v_{10} = 35.3$ |
| | | | $r_{20} = -71.466$ | $d_{20} = 2.43$ | | |
| | | $L_{11}$ | $r_{21} = -82.822$ | $d_{21} = 1.95$ | $n_{11} = 1.64000$ | $v_{11} = 60.1$ |
| | | | $r_{22} = 35.594$ | $d_{22} = 1.17$ | | |
| | | $L_{12}$ | $r_{23} = 39.030$ | $d_{23} = 3.71$ | $n_{12} = 1.72916$ | $v_{12} = 54.7$ |
| | | | $r_{24} = 105.609$ | | | |

| overall focal length | 100 | 150 | 195 |
| --- | --- | --- | --- |
| $d_6$ | 60.41 | 20.30 | 1.02 |
| $d_{18}$ | 11.73 | 6.30 | 3.70 |

$$\frac{f_{W_{12}}}{f_W} = 0.7143$$

$$\frac{|f_3|}{f_W} = 2.053$$

$$\frac{l_{W_2} - l_{T_2}}{l_{W_1} - l_{T_1}} = 0.135$$

| 1 : 5.60 overall focal length f = 100 – 195 half of the viewing angle ω = 24.06 – 12.64 |
|---|
| ΣP₃ = –0.353 |

The diaphragm A is positioned 6.20 after the fourteenth lens surface.

The fixed diaphragm B is positioned 3.00 after the twenty-fourth lens surface at the wide angle position and is moved in proportion to the movement of the third lens group. The proportion constant is 0.637. The fixed aperture of the fixed diaphragm B is 15.00.

Figure 4C:
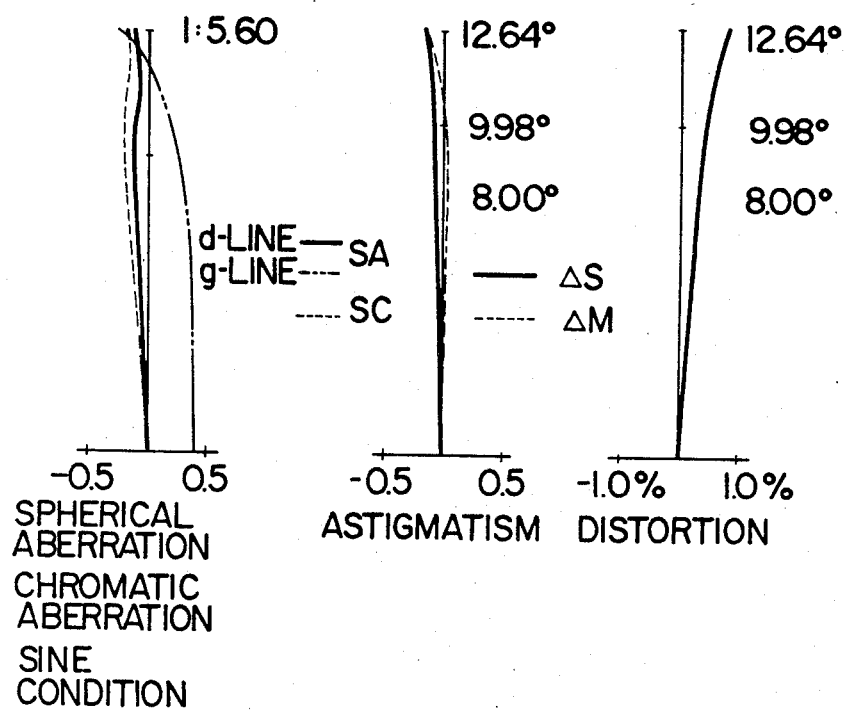
Figure 4A:
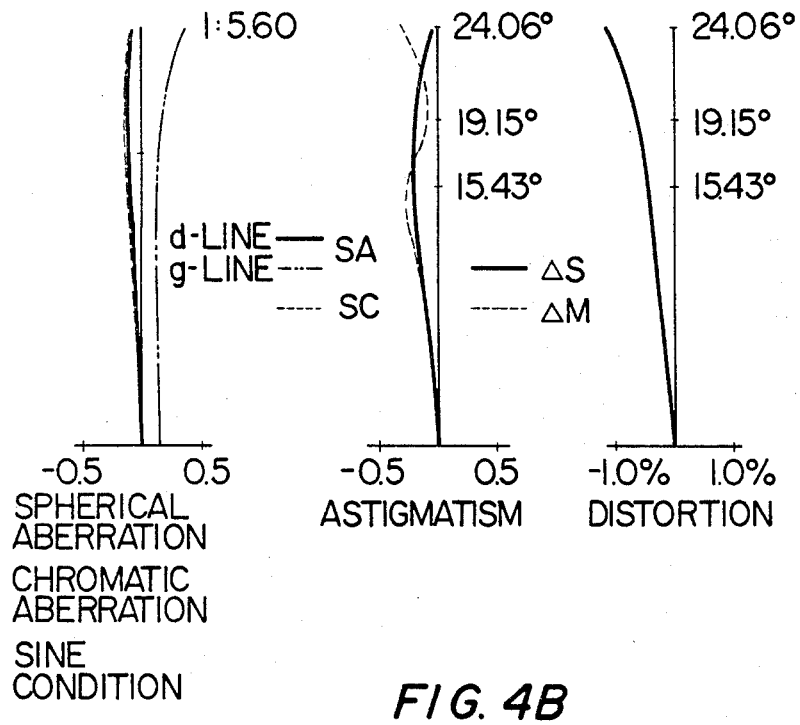
Figure 4B:
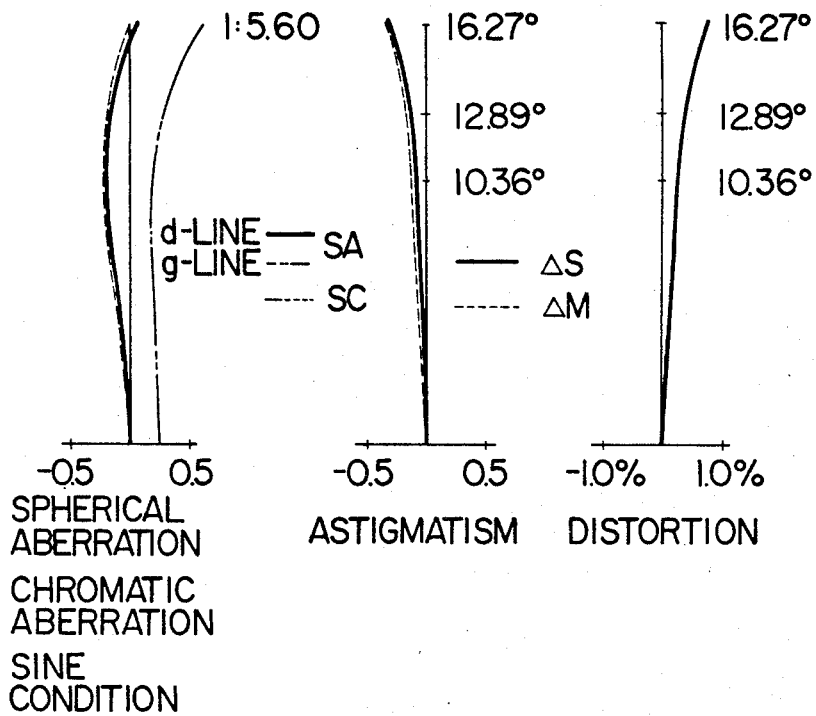

FIGS. 4A, 4B and 4C plot, respectively, the spherical and chromatic aberrations and sine condition, the astigmatism aberration, and the distortion aberration of the zoom lens system of Example 2 of the present invention at the wide angle, middle angle, and narrow angle positions, respectively.

What is claimed is:

1. A zoom lens system exhibiting a small distortion aberration, said zoom lens system comprising in order from the object side a first lens group having a negative focal length, a second lens group having a positive focal length, and a third lens group having a negative focal length, said first, second and third groups being relatively axially displaceable to maintain the image plane at a constant position, characterized by:
   (a) the resultant focal length of said first and second lens groups is always positive;
   (b) the third group of lens comprising, in order from the object side, a positive lens having a strong convex surface on the image side, a negative double concave lens, and a positive lens having a strong convex surface on the object side; and
   (c) the lens system satisfying the following conditions:
     (1) $0.55 < f_{W12}/f_W < 0.90$
     (2) $1.30 < |f_3|/f_W < 3.00$
     (3) $0.0 < (l_{W2} - l_{T2})/(l_{W1} - l_{T1}) < 0.33$, and
     (4) $-0.50 < \Sigma P_3 < 0.0$ wherein:
$f_W$ is the overall focal length at the wide angle position;
$f_{W12}$ is the resultant focal length of the first and second lens groups at the wide angle position;
$f_3$ is the focal length of the third lens group;
$l_{W1}$ is the aerial space between the first and second lens groups at the wide angle position;
$l_{W2}$ is the aerial space between the second and third lens groups at the wide angle position;
$l_{T1}$ is the aerial space between the first and second lens groups at the narrow or telescopic angle position;
$l_{T2}$ is the aerial space between the second and third lens groups at the narrow or telescopic angle position; and
$\Sigma P_3$ is the Petzval sum of the third lens group when the overall focal length is estimated as 1.0 at the wide angle position, and said zoom lens systems composed of twelve lenses grouped in three lens groups, in order from the object side to the image side, the first lens group having three lenses, with the first and second lenses $L_1$, $L_2$ being negative lenses, and third lens $L_3$ being a positive lens, the second lens group having six lenses, with the fourth, fifth and sixth lenses $L_4$, $L_5$, $L_6$ all being positive lenses, with the seventh lens $L_7$ being negative, and with the eighth and ninth lenses $L_8$, $L_9$ both being positive, an aperture A disposed between lenses $L_7$ and $L_8$, the third lens group having three lenses, with the tenth lens $L_{10}$ being a positive lens, with the eleventh lens $L_{11}$ being a negative double concave lens, and with the twelfth lens $L_{12}$ being a positive lens, a fixed diaphragm B disposed adjacent the image side of the twelfth lens $L_{12}$, wherein the radii of curvature $r_1$ to $r_{24}$, the spacing or thickness $d_1$ to $d_{23}$, the refractive indices $n_1$ to $n_{12}$ and Abbe numbers $\nu_1$ to $\nu_{12}$ of the lenses are as follows:

| 1 : 4.50 overall focal length f = 100 – 195 half of the viewing angle ω = 24.02 – 12.67 | | | | | |
|---|---|---|---|---|---|
| | lens | radius of curvature | spacing and thickness | refractive index at d-line | Abbe No. |
| first lens group | $L_1$ | $r_1 = 131.718$ $r_2 52.309$ | $d_1 = 4.27$ $d_2 = 15.63$ | $n_1 = 1.83400$ | $\nu_1 = 37.2$ |
| | $L_2$ | $r_3 = 352.328$ $r_4 = 325.646$ | $d_3 = 3.05$ $d_4 = 4.65$ | $n_2 = 1.62041$ | $\nu_2 = 60.3$ |
| | $L_3$ | $r_5 = 83.002$ $r_6 = 195.786$ | $d_5 = 7.56$ $d_6 = 60.18$ | $n_3 = 1.80518$ | $\nu_3 = 25.4$ |
| second lens group | $L_4$ | $r_7 = 105.305$ $r_8 1716.251$ | $d_7 = 6.10$ $d_8 = 0.12$ | $n_4 = 1.67000$ | $\nu_4 = 57.4$ |
| | $L_5$ | $r_9 = 62.784$ $r_{10} = 121.197$ | $d_9 = 6.10$ $d_{10} = 0.12$ | $n_5 = 1.72916$ | $\nu_5 = 54.7$ |
| | $L_6$ | $r_{11} = 44.664$ $r_{12} = 67.222$ | $d_{11} = 5.73$ $d_{12} = 9.67$ | $n_6 = 1.51633$ | $\nu_6 = 64.1$ |
| | $L_7$ | $r_{13} = 227.221$ $r_{14} = 38.928$ | $d_{13} = 3.32$ $9.51$ | $n_7 = 1.80518$ | $\nu_7 = 25.4$ |
| | $L_8$ | $r_{15} = 186.662$ $r_{16} = -135.927$ | $d_{15} = 5.18$ $d_{16} = 0.12$ | $n_8 = 1.51821$ | $\nu_8 = 65.0$ |
| | $L_9$ | $r_{17} = 74.796$ $r_{18} = 415.941$ | $d_{17} = 4.76$ $d_{18} = 13.01$ | $n_9 = 1.51633$ | $\nu_9 = 64.1$ |
| | | $r_{19} = 1144.956$ | $d_{19} =$ | $n_{10} = 1.60342$ | $\nu_{10} = 38.0$ |

-continued

| 1 : 4.50 overall focal length f = 100 – 195 half of the viewing angle ω = 24.02 – 12.67 | | | | | |
|---|---|---|---|---|---|
| third lens group | $L_{10}$ | $r_{20} = -73.422$ | $d_{20} = 2.45$ | | |
| | $L_{11}$ | $r_{21} = -82.044$ | $d_{21} = 2.68$ | $n_{11} = 1.62041$ | $\nu_{11} = 60.3$ |
| | | $r_{22} = 37.131$ | $d_{22} = 1.62$ | | |
| | $L_{12}$ | $r_{23} = 41.818$ | $d_{23} = 4.70$ | $n_{12} = 1.67000$ | $\nu_{12} = 57.4$ |
| | | $r_{24} = 150.531$ | | | |

| overall focal length | 100 | 150 | 195 |
|---|---|---|---|
| $d_6$ | 60.18 | 20.28 | 0.99 |
| $d_{18}$ | 13.01 | 6.13 | 2.80 |

$$\frac{f_{W12}}{f_W} = 0.7276$$

$$\frac{|f_3|}{f_W} = 2.237$$

$$\frac{l_{W2} - l_{T2}}{l_{W1} - l_{T1}} = 0.172$$

$$\Sigma P_3 = -0.325$$

2. A zoom lens system exhibiting a small distortion aberration, said zoom lens system comprising in order from the object side a first lens group having a negative focal length, a second lens group having a positive focal length, and a third lens group having a negative focal length, said first, second and third groups being relatively axially displaceable to maintain the image plane at a constant position, characterized by:
  (a) the resultant focal length of said first and second lens groups is always positive;
  (b) the third group of lens comprising, in order from the object side, a positive lens having a strong convex surface on the image side, a negative double concave lens, and a positive lens having a strong convex surface on the object side; and
  (c) the lens system satisfying the following conditions:
    (1) $0.55 < f_{W12}/f_W < 0.90$
    (2) $1.30 < |f_3|/f_W < 3.00$
    (3) $0.0 < (l_{W2} - l_{T2})/(l_{W1} - l_{T1}) < 0.33$, and
    (4) $-0.50 < \Sigma P_3 < 0.0$
  wherein:
    $f_W$ is the overall focal length at the wide angle position
    $f_{W12}$ is the resultant focal length of the first and second lens groups at the wide angle position;
    $f_3$ is the focal length of the third lens group;
    $l_{W1}$ is the aerial space between the first and second lens groups at the wide angle position;
    $l_{W2}$ is the aerial space between the second and third lens groups at the wide angle position;
    $l_{T1}$ is the aerial space between the first and second lens groups at the narrow or telescopic angle position;
    $l_{T2}$ is the aerial space between the second and third lens groups at the narrow or telescopic angle position; and
    $\Sigma P_3$ is the Petzval sum of the third lens group when the overall focal length is estimated as 1.0 at the wide angle position, and
  said zoom lens systems composed of twelve lenses grouped in three lens groups, in order from the object side to the image side, the first lens group having three lenses, with the first and second lenses $L_1$, $L_2$ being negative lenses, and third lens $L_3$ being a positive lens, the second lens group having six lenses, with the fourth, fifth and sixth lenses $L_4$, $L_5$, $L_6$ all being positive lenses, with the seventh lens $L_7$ being negative, and with the eighth and ninth lenses $L_8$, $L_9$ both being positive, an aperture A disposed between lenses $L_7$ and $L_8$, the third lens group having three lenses, with the tenth lens $L_{10}$ being a positive lens, with the eleventh lens $L_{11}$ being a negative double concave lens, and with the twelfth lens $L_{12}$ being a positive lens, a fixed diaphragm B disposed adjacent the image side of the twelfth lens $L_{12}$, wherein the radii of curvature $r_1$ to $r_{24}$, the spacing or thickness $d_1$ to $d_{23}$, the refractive indices $n_1$ to $n_{12}$ and Abbe numbers $\nu_1$ to $\nu_{12}$ of the lenses are as follows:

| 1 : 5.60 overall focal length f = 100 - 195 half of the viewing angle ω = 24.06 - 12.64 | | | | | |
|---|---|---|---|---|---|
| | lens | radius of curvature | spacing and thickness | refractive index at d-line | Abbe No. |
| first lens group | $L_1$ | $r_1 = 224.091$ | $d_1 = 3.61$ | $n_1 = 1.83400$ | $\nu_1 = 37.2$ |
| | | $r_2 = 52.831$ | $d_2 = 11.96$ | | |
| | $L_2$ | $r_3 = -631.977$ | $d_3 = 2.93$ | $n_2 = 1.72916$ | $\nu_2 = 54.7$ |
| | | $r_2 = 630.769$ | $d_4 = 3.05$ | | |
| | $L_3$ | $r_5 = 77.073$ | $d_5 = 6.44$ | $n_5 = 1.80518$ | $\nu_1 = 25.4$ |
| | | $r_6 = 208.593$ | $d_6 = 60.41$ | | |
| | $L_4$ | $r_7 = 85.176$ | $d_7 = 6015$ | $n_4 = 1.64000$ | $\nu_4 = 60.1$ |
| | | $r_8 = 528.837$ | $d_8 = 0.12$ | | |
| | $L_5$ | $r_9 = 59.403$ | $d_9 = 5.46$ | $n_5 = 1.69680$ | $\nu_5 = 55.5$ |
| | | $r_{10} = 120.931$ | $d_{10} = 0.12$ | | |
| second | $L_6$ | $r_{11} = 42.802$ | $d_{11} = 5.07$ | $n_6 = 1.51633$ | $\nu_6 = 64.1$ |

-continued

| | | | 1 : 5.60 overall focal length f=100—195 half of the viewing angle ω=24.06—12.64 | | | |
|---|---|---|---|---|---|---|
| lens group | | | $r_{12} = 65.623$ | $d_{12} = 10.07$ | | |
| | $L_7$ | | $r_{13} = 192.384$ | $d_{13} = 2.44$ | $n_7 = 1.8.518$ | $\nu_7 = 25.4$ |
| | | | $r_{14} = 35.021$ | $d_{14} = 7.51$ | | |
| | $L_8$ | | $r_{15} = 247.823$ | $d_{15} = 3.90$ | $n_8 = 1.51821$ | $\nu_8 = 65.0$ |
| | | | $r_{16} = -126.779$ | $d_{16} = 0.12$ | | |
| | $L_9$ | | $r_{16} = 64.027$ | $d_{17} = 3.90$ | $n_9 = 1.51821$ | $\nu_9 = 65.0$ |
| | | | $r_{18} = 377.138$ | $d_{18} = 11.73$ | | |
| third lens group | $L_{10}$ | | $r_{19} = 2820.048$ | $d_{19} = 3.71$ | $n_{10} = 1.59270$ | $\nu_{10} = 35.3$ |
| | | | $r_{20} = -71.466$ | $d_{20} = 2.43$ | | |
| | $L_{11}$ | | $r_{21} = -82.822$ | $d_{21} = 1.95$ | $n_{11} = 1.64000$ | $\nu_{11} = 60.1$ |
| | | | $r_{22} = 35.594$ | $d_{22} = 1.17$ | | |
| | $L_{12}$ | | $r_{23} = 39.030$ | $d_{23} = 3.71$ | $n_{12} = 1.72916$ | $\nu_{12} = 54.7$ |
| | | | $r_{24} = 105.609$ | | | |

| overall focal length | 100 | 150 | 195 |
|---|---|---|---|
| $d_6$ | 60.41 | 20.30 | 1.02 |
| $d_{18}$ | 11.73 | 6.30 | 3.70 |

$$\frac{f_{W12}}{f_W} = 0.7143$$

$$\frac{|f_3|}{f_W} = 2.053$$

$$\frac{l_{W2} - l_{T2}}{l_{W1} - l_{T1}} = 0.135$$

$$\Sigma P_3 = -0.353$$